United States Patent
Tanemura

(10) Patent No.: US 10,611,068 B2
(45) Date of Patent: Apr. 7, 2020

(54) SAFETY COVER FOR MOLD CLAMPING DEVICE

(71) Applicant: NISSEI PLASTIC INDUSTRIAL CO., LTD., Hanishina-gun, Nagano-ken (JP)

(72) Inventor: Daiki Tanemura, Nagano-ken (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 16/000,122

(22) Filed: Jun. 5, 2018

(65) Prior Publication Data

US 2019/0001542 A1 Jan. 3, 2019

(30) Foreign Application Priority Data

Jun. 29, 2017 (JP) .................................. 2017-127117

(51) Int. Cl.
| | |
|---|---|
| *B29C 45/84* | (2006.01) |
| *B29C 45/17* | (2006.01) |
| *B29C 45/64* | (2006.01) |

(52) U.S. Cl.
CPC .............. *B29C 45/17* (2013.01); *B29C 45/64* (2013.01); *B29C 45/84* (2013.01); *B29C 2045/1797* (2013.01)

(58) Field of Classification Search
CPC .. B29C 45/17; B29C 45/84; B29C 2045/1797
See application file for complete search history.

(56) References Cited

U.S. PATENT DOCUMENTS

| | | | | |
|---|---|---|---|---|
| 3,771,936 | A * | 11/1973 | Moslo ..................... | B29C 45/84 425/153 |
| 4,578,026 | A * | 3/1986 | Hehl ....................... | B29C 45/84 425/151 |
| 5,017,121 | A * | 5/1991 | Hehl ................... | B29C 45/1769 425/151 |
| 8,336,601 | B2 * | 12/2012 | Ono ....................... | B22D 17/26 164/152 |

FOREIGN PATENT DOCUMENTS

| | | | |
|---|---|---|---|
| JP | 56030441 | | 7/1981 |
| JP | 7-205250 | * | 8/1995 |
| JP | 2000161353 | | 6/2000 |

OTHER PUBLICATIONS

Notice of Reasons for Refusal dated Oct. 29, 2019 in Japanese Application No. 2017-127117 together with English-Language translation thereof.

* cited by examiner

*Primary Examiner* — James P Mackey
(74) *Attorney, Agent, or Firm* — Adams & Wilks

(57) ABSTRACT

A safety cover (20) for a mold clamping device that surrounds the mold clamping device (10) of an injection molding machine. The safety cover (20) includes a support frame (21) attached to the mold clamping device (10), a safety door (23), and a connecting mechanism (40) that connects an upper portion of the safety door (23) to the support frame (21). The connecting mechanism (40) includes a first rail (41) on the support frame (21), a second rail (42) on the safety door (23), and an intermediate plate (45) arranged between the first rail (41) and the second rail (42).

8 Claims, 9 Drawing Sheets

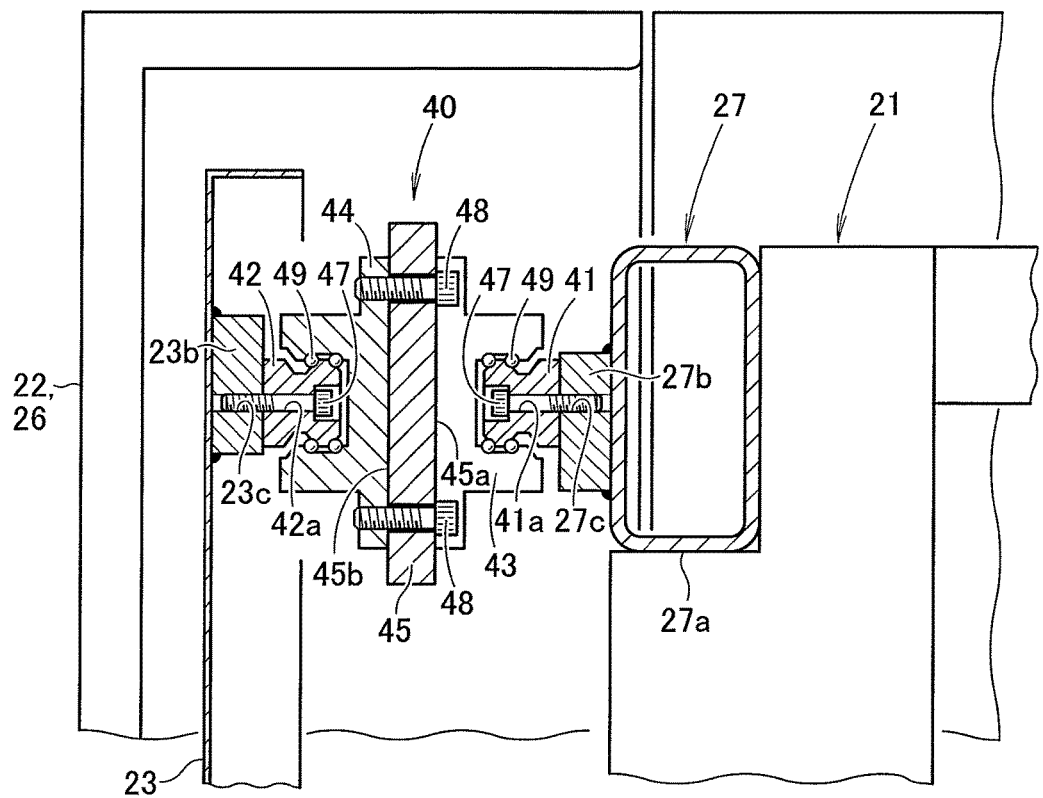

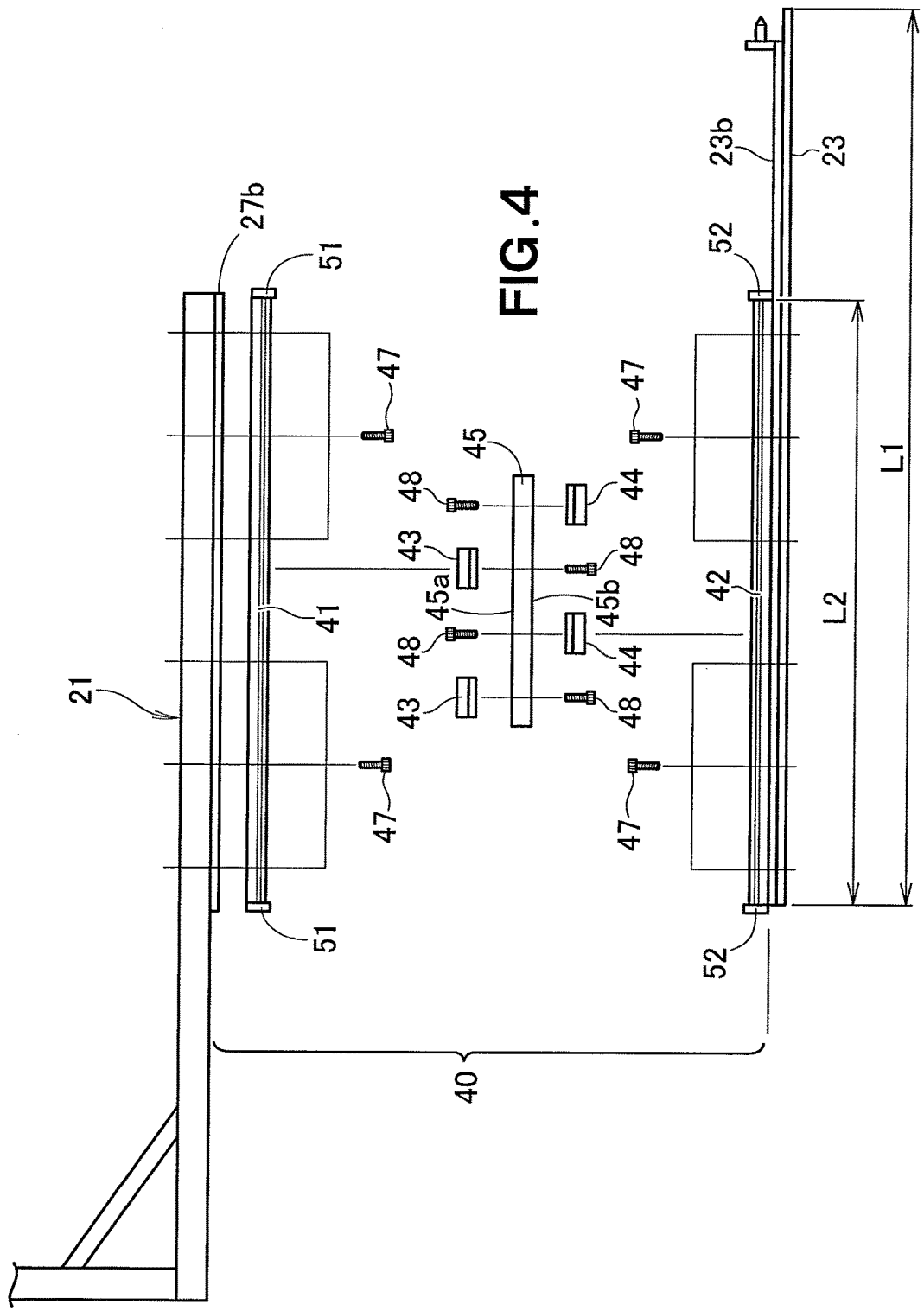

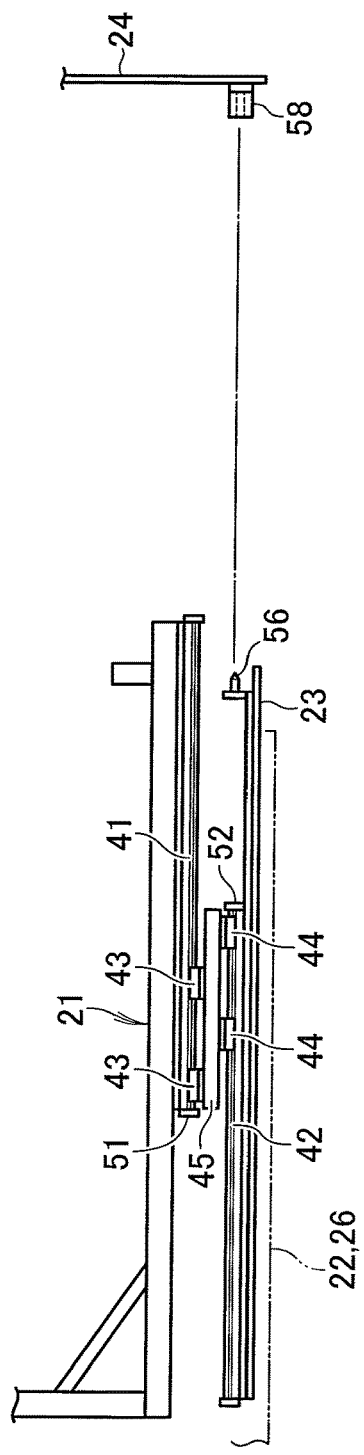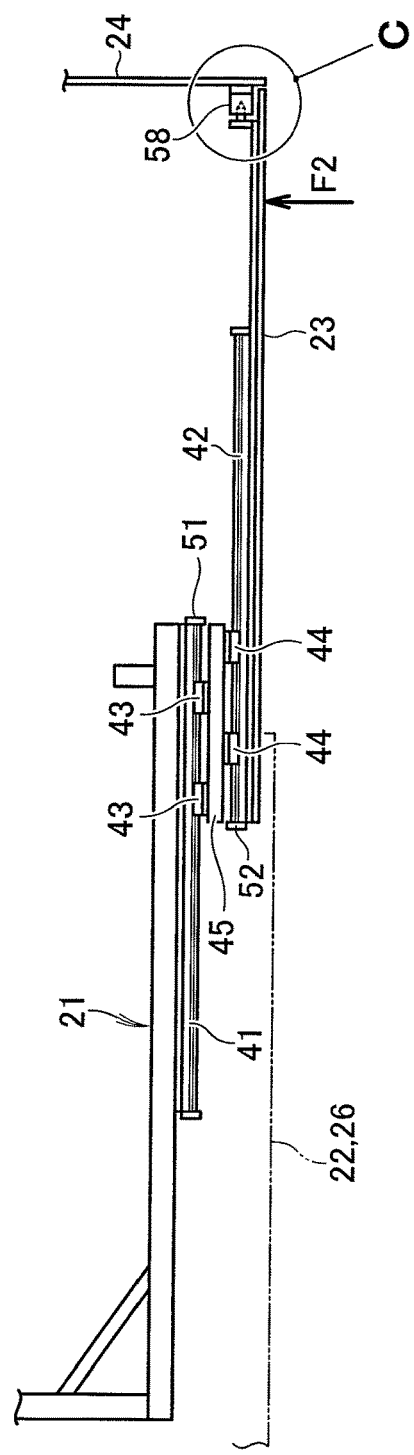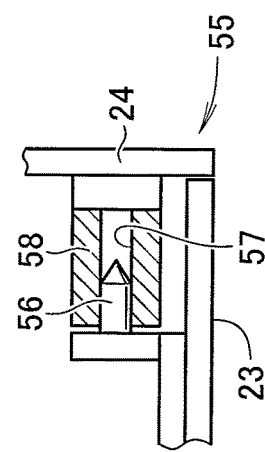

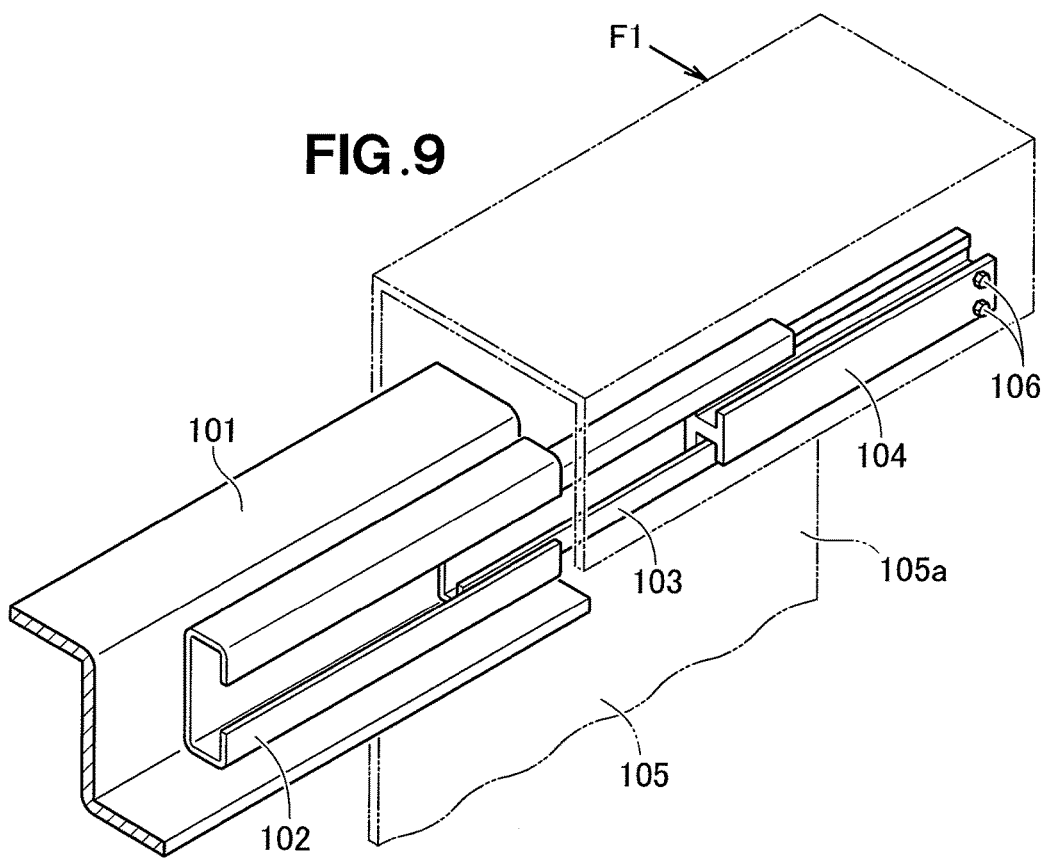

SAFETY COVER FOR MOLD CLAMPING DEVICE

FIELD OF THE INVENTION

An injection molding machine includes, as its major components, an injection device and a mold clamping device. The present invention relates to a safety cover for the mold clamping device, which surrounds the mold clamping device.

BACKGROUND OF THE INVENTION

In the mold clamping device, a movable platen and a movable mold move reciprocally. Safety of workers and operators is ensured by surrounding the mold clamping device with a safety cover.

One example of such safety covers for the mold clamping device is disclosed in Japanese Patent No. 3265104, and is known in the art.

The safety cover disclosed in Japanese Patent No. 3265104 will be described with reference to FIG. 7 to FIG. 9 of the accompanying drawings.

As shown in FIG. 7, a lateral frame 101 extends horizontally, and a lower frame 111 is arranged below the lateral frame 101. A safety door 105 is attached to (across) the lateral frame 101 and the lower frame 111. The safety door 105 moves horizontally. In FIG. 7, the safety door 105 is in an open position. An operator can physically enter the inside from an opening 107.

When the operator enters the inside from the opening 107, the lateral frame 101 becomes an obstacle. This will decrease the work efficiency of the operator.

There is a demand for a structure that can improve the work efficiency. A structure that meets such demand will be described with reference to FIG. 8 to FIG. 9.

As shown in FIG. 8, a lateral frame 101 extends in a direction perpendicular to the drawing sheet. A lower frame 111, which has a rectangular cylinder shape, is arranged below the lateral frame 101. The lower frame 111 also extends in a direction perpendicular to the drawing sheet.

A casing 102 is secured to the lateral frame 101. A cross-sectional shape of the casing 102 is "C." A first movable member 103 is received in the casing 102. A cross-sectional shape of the first movable member 103 is "C." A second movable member 104 is received in the first movable member 103. A cross-sectional shape of the second movable member 104 is "H." The first movable member 103 moves relative to the casing 102 in a direction perpendicular to the drawing sheet. The second movable member 103 moves relative to the second movable member 103 in a direction perpendicular to the drawing sheet.

An upper portion of a safety door 105 is attached to the second movable member 104 with bolts 106, and a lower portion of the safety door 105 is placed on the lower frame 111 via wheels 112.

The safety door 105 moves along the lateral frame 101 and the lower frame 111, and is brought into an open state or a closed state.

FIG. 9 is a perspective view useful to describe a front end (free end) of the lateral frame.

As shown in FIG. 9, the C-shaped casing 102 is secured on a front end of the lateral frame 101. The C-shaped first movable member 103 is received in the casing 102 such that the first movable member 103 can move in an axial direction. The H-shaped second movable member 104 is received in the first movable member 103 such that the second movable member 104 can move in the axial direction. The safety door 105 is secured to the front end of the second movable member 104 with the bolts 106.

Having a so-called telescopic structure, the first movable member 103 has a smaller diameter than the casing 102, and the second movable member 104 has a smaller diameter than the first movable member 103.

A force F1 may act onto the front end 105a of the safety door 105 from the outside toward the inside. The second movable member 104 has a cantilevered structure, and a maximum displacement occurs at the front end. In addition, the second movable member 104 has smaller bending rigidity (flexural rigidity) than the first movable member 103 and the casing 102.

Consequently, the force F1 displaces the front end 105a of the safety door 105 even if the force F1 is small.

From the viewpoint of safety, the safety door 105 needs to have rigidity. If the second movable member 104 has a large diameter, it is possible to decrease or suppress the displacement. However, if the second movable member 104 has a large diameter, the first movable member 103 has a large diameter, and the casing has an even larger diameter. Thus, the weight increase of the first and second movable members and the casing is not avoidable, and the material cost increase of the first and second movable members and the casing is not avoidable.

When the safety door 105, which is indicated by a phantom line in FIG. 9, is looked at, the safety door is connected to the second movable member 104 with the bolts 106. Thus, a certain load acts on the connecting part between the safety door and the second movable member. Accordingly, it is necessary to reinforce the safety door 105 in the vicinity of the connecting part, i.e., at an upper side of the safety door 105.

In view of the foregoing, there is a demand for a safety cover that can avoid a significant cost increase in reinforcing the upper side of the safety door 105, and allows the second movable member 104 to have a large diameter without influencing the casing 102 and the first movable member 103.

SUMMARY OF THE INVENTION

An object of the present invention is to provide a safety cover that allows the second movable member to have a large diameter without influencing the casing and the first movable member.

According to one aspect of the present invention, there is provided a safety cover for a mold clamping device that surrounds the mold clamping device of an injection molding machine, the safety cover including:

a support frame attached to the mold clamping device;

a stationary cover secured to the support frame;

a lower rail disposed on the support frame; and a safety door having a wheel (or wheels) at a lower portion thereof such that the safety door horizontally moves as the wheel rotates (or the wheels rotate) on the lower rail, an upper portion of the safety door being connected to the support frame via a connecting mechanism, the connecting mechanism including a first rail that is mounted on (or attached to) the support frame and extends in a moving direction of the safety door, a second rail mounted on (or attached to) an upper portion of a back face of the safety door and extends in the moving direction of the safety door, a pair of first sliders movably engaged over the first rail, a pair of second sliders movably engaged over the second rail, and an intermediate plate arranged between the first rail and the second rail, and the intermediate plate having one face that supports the pair of first sliders and another face (opposite face) that supports the pair of second sliders.

In the present invention, the first rail is attached to the support frame that is configured to support the safety cover, and the second rail is attached to the upper portion of the back face of the safety door. The intermediate plate that includes the first sliders engaged over the first rail and the second sliders engaged over the second rail on its opposite faces respectively connects the second rail to the first rail.

As the second rail attached to the safety door extends from one end of the first rail attached to the support frame, the safety door is brought into the closed position. As the second rail is moved over the first rail, then the safety door is brought into the open position. In the open position, the lateral frame 101 is absent above the opening 107 shown in FIG. 7. Because the lateral frame 101 is absent, the degree of freedom of the operator increases and the work efficiency of the operator improves.

Also, it is possible to decide the size of the second rail without being influenced by the size of the first rail.

The present invention, therefore, provides a safety cover that has the second movable member (the second rail in the present invention) with a large diameter, without influencing the casing and the first movable member (the first rail and the intermediate plate in the present invention).

Preferably, the length of the second rail is set in a range from 0.5×the length of the safety door to 1.0×the length of the safety door. When the length of the second rail is set in the range from 0.5×the length of the safety door to 1.0×the length of the safety door, it is possible to keep the good appearance while reinforcing the safety door with the second rail. Part of the second rail would not become an obstacle when the mold is changed. Because the second rail is an indispensable element, the reinforcement to the safety door would not increase the cost.

Therefore, provided is the safety cover that does not incur a significant cost in connection with the reinforcement to the upper side of the safety door, and that allows the second movable member (the second rail in the present invention) to have a large diameter without influencing the casing and the first movable member (the firs rail and the intermediate plate in the present invention).

Preferably, the length of the second rail is set to two-thirds of the length of the safety door. When the second rail has this length, it is possible for the first rail to have the same length as the length of the second rail.

Preferably, a pair of first sliders and a pair of second sliders are arranged in a staggered layout when viewed from above.

The first sliders may be brought into contact with one face (first face) of the intermediate plate and the bolts may be inserted and screwed into the first sliders from the opposite face (second face) of the intermediate plate. Subsequently, the second sliders may be brought into contact with the second face of the intermediate plate and the bolts may be inserted and screwed into the second sliders from the first face of the intermediate plate. Because the first sliders and the second sliders are arranged in the staggered layout, the bolts do not interfere with the first sliders and the second sliders.

Preferably, the safety door has a coupling mechanism that is mechanically coupled to the support frame when the safety door is fully closed, and the coupling mechanism includes a rod that protrudes from an upper portion of the safety door and has a sharp point, and also includes a support block that is provided on the support frame and has an engagement hole such that the rod fits in the engagement hole. As the sharp-point rod fits in the engagement hole of the support block, it is possible to prevent the front end of the safety door from vibrating and moving when the safety door is in the full closed position.

Preferably, the safety door has a coupling mechanism that is mechanically coupled to the support frame when the safety door is fully closed, and the coupling mechanism includes a rod that protrudes from the support frame and has a sharp point, and also includes a support block that is provided on an upper portion of the safety door and has an engagement hole such that the rod fits in the engagement hole. As the sharp-point rod fits in the engagement hole of the support block, it is possible to prevent the front end of the safety door from vibrating and moving when the safety door is in the full closed position.

Preferably, first stoppers are provided at right and left ends of the first rail to prevent the first sliders from falling off, respectively, and second stoppers are provided at right and left ends of the second rail to prevent the second sliders from falling off, respectively.

The stoppers prevent the first sliders from falling off the first rail, and prevent the second sliders from falling off the second rail.

Preferably, each of the first sliders is a linear motion guide that has steel balls between the first slider and the first rail, and each of the second sliders is another linear motion guide that has steel balls between the second slider and the second rail. Because the first sliders and the second sliders have the steel balls therein, it is possible to reduce the movement resistance of the first sliders and the second sliders.

BRIEF DESCRIPTION OF THE DRAWINGS

Hereinafter, several preferred embodiments of the present invention will be described in detail with reference to the accompanying drawings, in which

FIG. 3 is an enlarged view of major portions of FIG. 2;

FIG. 4 is an exploded view of the safety cover;

FIG. 5A is a view useful to describe the safety door in a full open state;

FIG. 5B is a view useful to describe the safety door in a full closed state;

FIG. 5C is an enlarged view of the part C in FIG. 5B;

FIG. 9 is a perspective view of major portions of the conventional safety cover shown in FIG. 8.

DETAILED DESCRIPTION OF THE PREFERRED EMBODIMENTS

Embodiments of the present invention will be described hereinafter with reference to the accompanying drawings.

Figure 1:
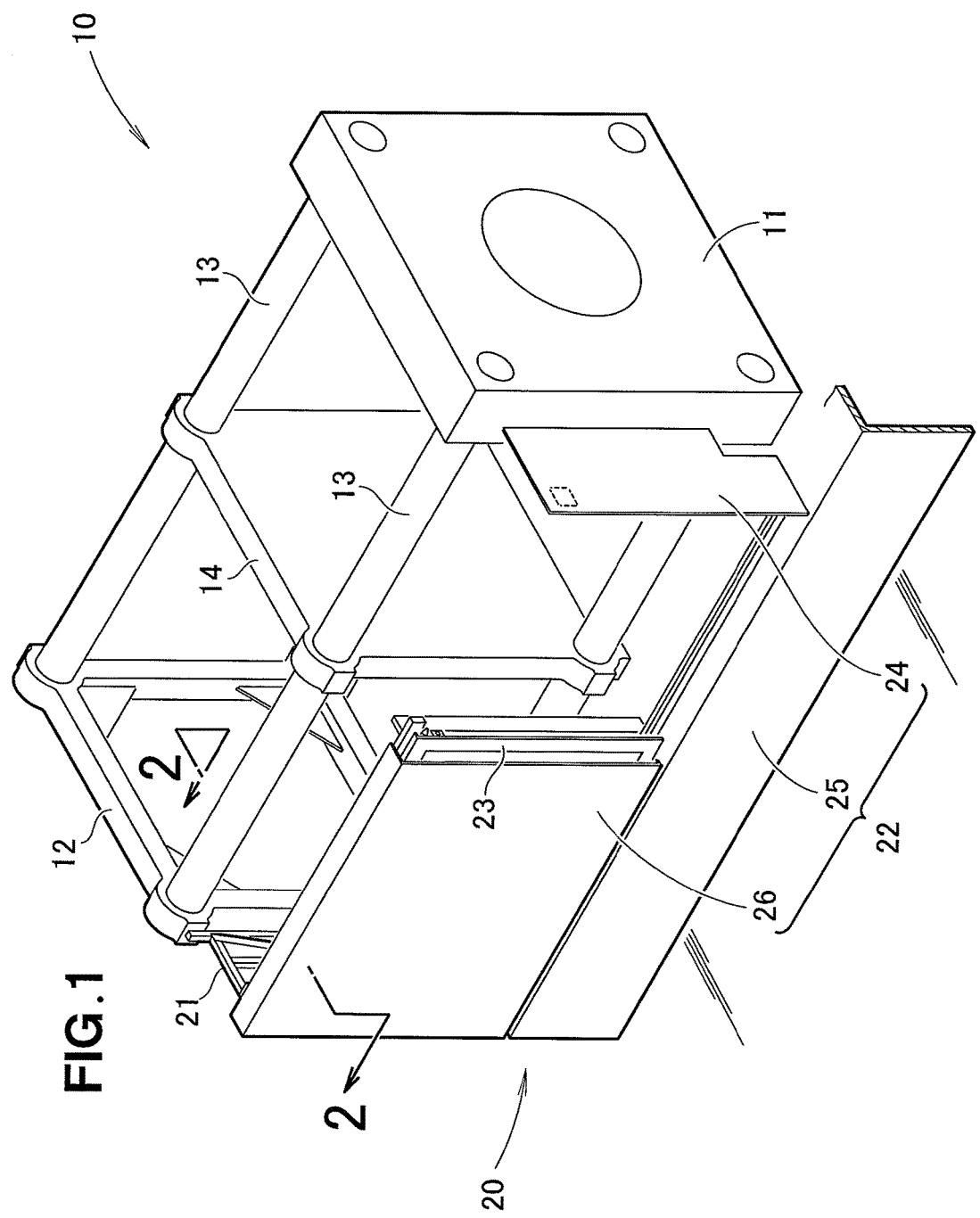
FIG. 1 is a perspective view of a mold clamping device having a safety cover according to an embodiment of the present invention.

As shown in FIG. 1, a clamping device 10 for an injection molding machine (hereinafter referred to as "clamping device") includes, as its major elements, a stationary platen 11, a pressure-receiving platen 12, which is parallel to the stationary platen 11, tie bars spanning the stationary platen 11 and the pressure-receiving platen 12, a movable platen 14 arranged between the stationary platen 11 and the pressure-receiving platen 12 such that the movable platen 14 is guided by the tie bars 13, and a mechanism (not shown) for pushing (pressing) the movable platen 14 toward the stationary platen 11 from the starting point (i.e., the pressure-receiving panel 12). The clamping device 10 is configured to clamp molds with the stationary platen 11 and the movable platen 14.

Such clamping device 10 is covered with a safety cover 20 because the clamping device includes movable elements.

The safety cover 20 includes a support frame 21 attached to the clamping device 10, a stationary cover 22 secured to the support frame 21, and a safety door 23 supported by the support frame 21 such that the safety door 23 can move horizontally.

The stationary cover 22 is a group of covers, i.e., the stationary cover 22 has a front cover 24 standing in the vicinity of the stationary panel platen 11, a lower cover 25 arranged along a lower side of the clamping device 10, and a front cover 26 that extends from the pressure-receiving platen 12 to the movable platen 14 to cover the lateral face of the clamping device 10. The front cover 26 serves as a door closet to house a safety door 23.

Figure 2:
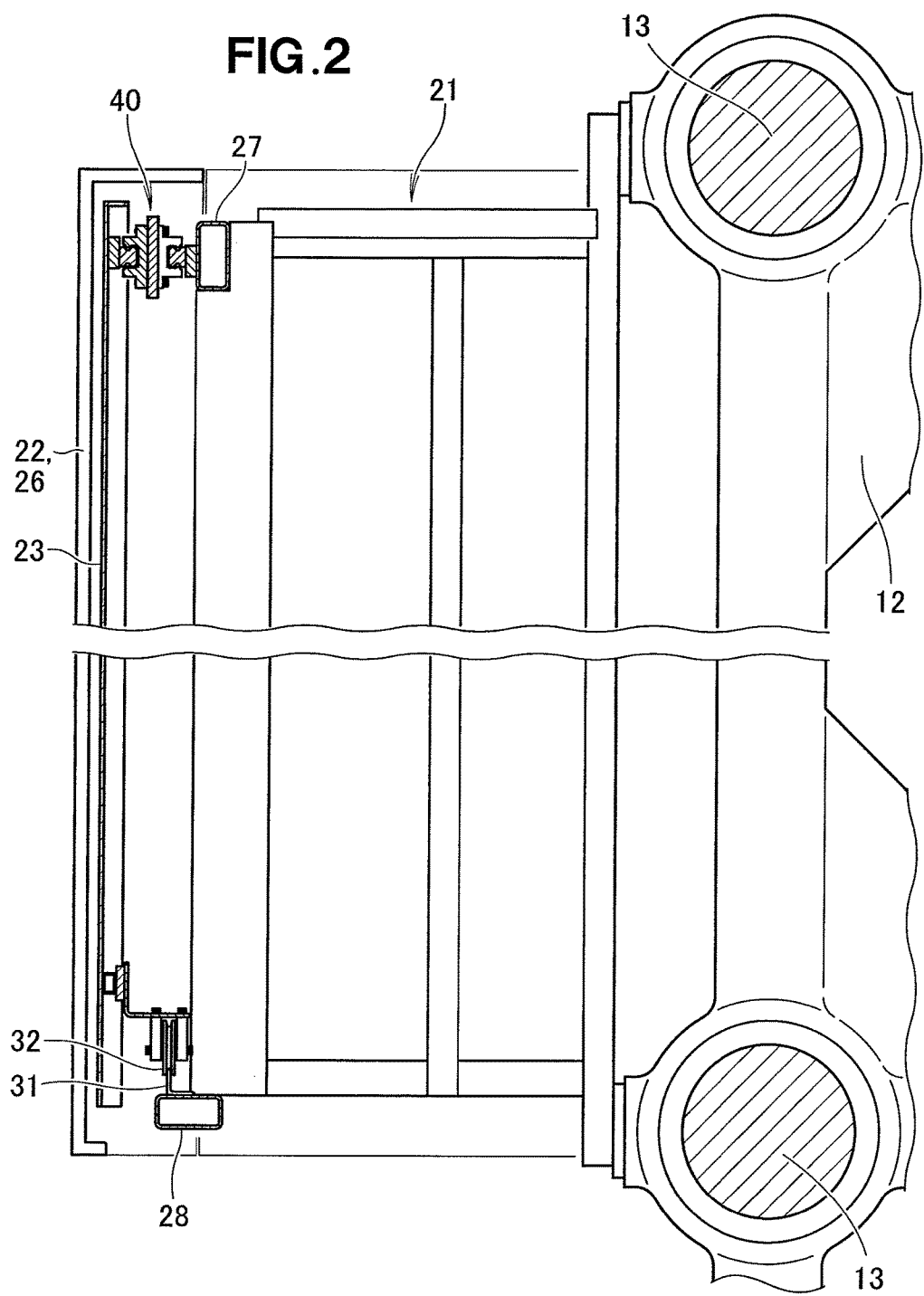
FIG. 2 is a cross-sectional view taken along the line 2-2 in FIG. 1.

As shown in FIG. 2, the support frame 21 has an upper frame 27 and a lower frame 28, both extending in a direction perpendicular to the drawing sheet. The support frame 21 is also connected to the pressure-receiving platen 12. It should be noted that the support frame 21 is a combination of steel frames, and may have an arbitrary structure.

A lower rail 31 extends on (and along) the lower frame 28, and a wheel 32 rides the lower rail 31 such that the wheel 32 can rotate on the lower rail 31. The safety door 23 is supported by the wheel 32. The wheel 32 may be replaced with a roller or a similar component.

An upper portion of the safety door 23, which is supported by the wheel 32 disposed at the lower position, is movably connected to the support frame 21. This ensures stable traveling (movements) of the safety door 23.

To accomplish this in the embodiment, the upper portion of the safety door 23 is connected to the upper frame 27 via a connecting mechanism 40. The detail of the connecting mechanism 40 will be described with reference to FIG. 3.

As shown in FIG. 3, the connecting mechanism 40 includes a first rail 41 that is attached to the upper frame 27 on the support frame 21 and extends in a moving direction of the safety door 23 (direction perpendicular to the drawing sheet), a second rail 42 that is attached to a back face of an upper portion of the safety door 23 and extends in the moving direction of the safety door 23, first sliders 43 fitted over the first rail 41 such that the first sliders 43 can move along the first rail 41, second sliders 44 fitted over the second rail 42 such that the second sliders 44 can move along the second rail 42, and an intermediate plate 45 arranged between the first rail 41 and the second rail 42.

The intermediate plate 45 has one face 45a that supports the first sliders 43 and another face (opposite face) 45b that supports the second sliders 44.

Preferably, the upper frame 27 has a light-weight rectangular pipe 27a, and a first plate 27b affixed to the light-weight rectangular pipe 27a. The first plate 27b is a steel member that has a thickness in which a female thread 27c can be formed.

The first rail 41 has a screw hole 41a to receive a hexagon socket head cap screw 47. The hexagon socket head cap screw 47, including a screw head, is received in the screw hole 41a, and only the front end (free end) of the screw protrudes from the first rail 41. As the screw front end is screwed into the female thread 27c, the first rail 41 is mounted on the first plate 27b in a removable manner.

The first sliders 43 engaged over the first rail 41 are secured to the intermediate plate 45 with bolts 48. Preferably, steel balls 49 are arranged between the first sliders 43 and the first rail 41. This configuration is referred to as a "linear motion guide," and has a reduced friction resistance.

The second plate 23b that has the female thread 23c is secured to the upper portion of the back face of the safety door 23.

The second rail 42 also has a screw hole 42a to receive the hexagon socket head cap screw 47. The hexagon socket head cap screw 47, including a screw head, is received in the screw hole 42a, and only the front end of the screw protrudes from the second rail 42. As the screw front end is screwed into the female thread 23c, the second rail 42 is mounted on the second plate 23b in a removable manner.

The second sliders 44 engaged over the second rail 42 are secured to the intermediate plate 45 with bolts 48. Preferably, steel balls 49 are arranged between the second sliders 44 and the second rail 42.

It should be noted that the steel balls 49 may not be arranged between the first rail 41 and the first sliders 43 and between the second rail 42 and the second sliders 44, instead of the configuration that arranges the steel balls 49 between the first rail 41 and the first sliders 43 and between the second rail 42 and the second sliders 44. The steel balls 49 may be replaced with steel rollers.

The structure of the connecting mechanism 40 that is described above will be described in detail with reference to FIG. 4.

As shown in FIG. 4, the connecting mechanism 40 includes the first rail 41 that is attached to the support frame 21 and extends in the moving direction of the safety door 23, the second rail 42 that is attached to the upper portion of the back face of the safety door 23 and extends in the moving direction of the safety door 23, a pair of first sliders 43 movably engaged over the first rail 41, a pair of second sliders 44 movably engaged over the second rail 42, and the intermediate plate 45 that supports a pair of first sliders 43 on its one face 45a, supports a pair of second sliders 44 on an opposite face 45b, and is arranged between the first rail 41 and the second rail 42.

Preferably, a pair of first slider 43 and a pair of second sliders 44 are arranged in a staggered layout when viewed from above. The staggered layout is a layout in which one of the second sliders 44 is situated between the two adjacent first sliders 43, and one of the first sliders 43 is situated between the two adjacent second sliders 44.

The first sliders 43 are brought into contact with a first face (one face) of the intermediate plate 45, and the bolts 48 are screwed into the first sliders 43 from a second face (opposite face) of the intermediate plate 45. Subsequently, the second sliders 44 are brought into contact with the second face of the intermediate plate 45, and the bolts 48 are screwed into the second sliders 44 from the first face of the intermediate plate 45. Because the first and second sliders are arranged in the staggered layout, the bolts 48 do not touch the first sliders 43 and the second sliders 44 (i.e., the bolts do not interfere with the first and second sliders). Thus, the installing and the screwing of the bolts 48 is facilitated.

Preferably, first stoppers 51 are provided at right and left ends of the first rail 41, respectively, and second stoppers 52 are provided at right and left ends of the second rail 42, respectively.

The first stoppers 51 prevent the first sliders 43 from falling off the first rail 41. The second stoppers 52 prevent the second sliders 44 from falling off the second rail 42.

The first rail 41 is secured to the first plate 27b, and the intermediate plate 45 is attached to the first rail 41 with the first sliders 43 being interposed between the intermediate plate 45 and the first rail 41. The second rail 42 is engaged with the second sliders 44 that are situated on the intermediate plate 45. Thus, the safety door 23 is attached to the support frame 21 with the intermediate plate 45 being interposed between the safety door 23 and the support frame 21. The combination of the above-mentioned components upon assembling is shown in FIG. 5A.

In FIG. 5A, the safety door 23 is in a full open state. Most (or entirety) of the safety door 23 is received in the front cover 26, which is part of the stationary cover 22.

Figure 7:
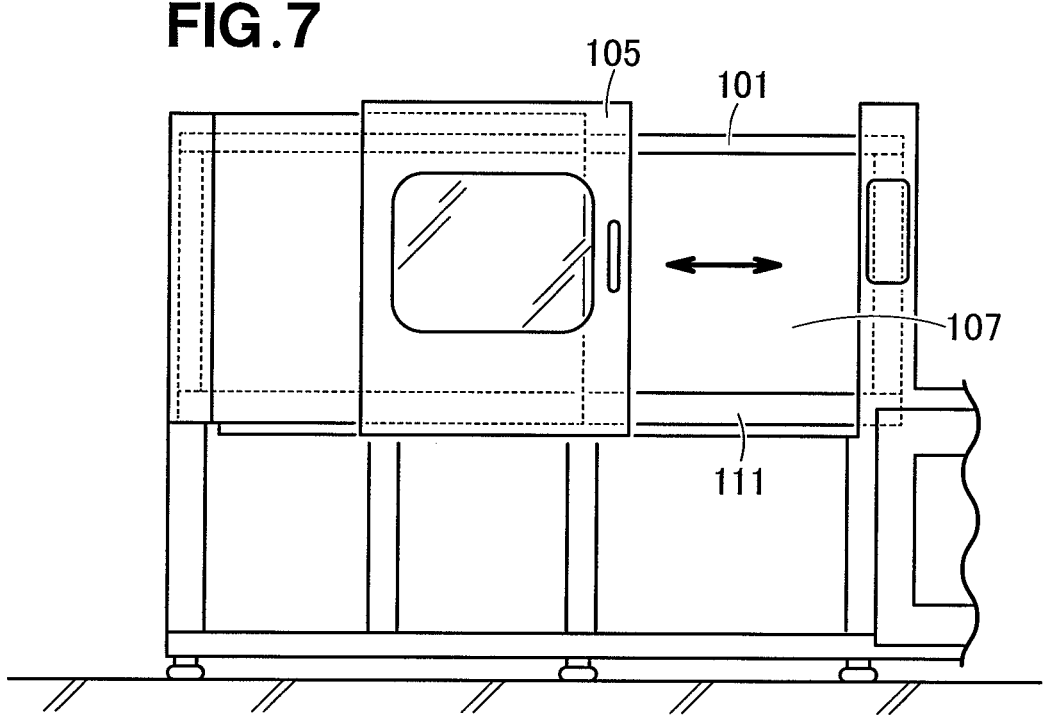
FIG. 7 is a front view of a conventional safety cover.
Figure 8:
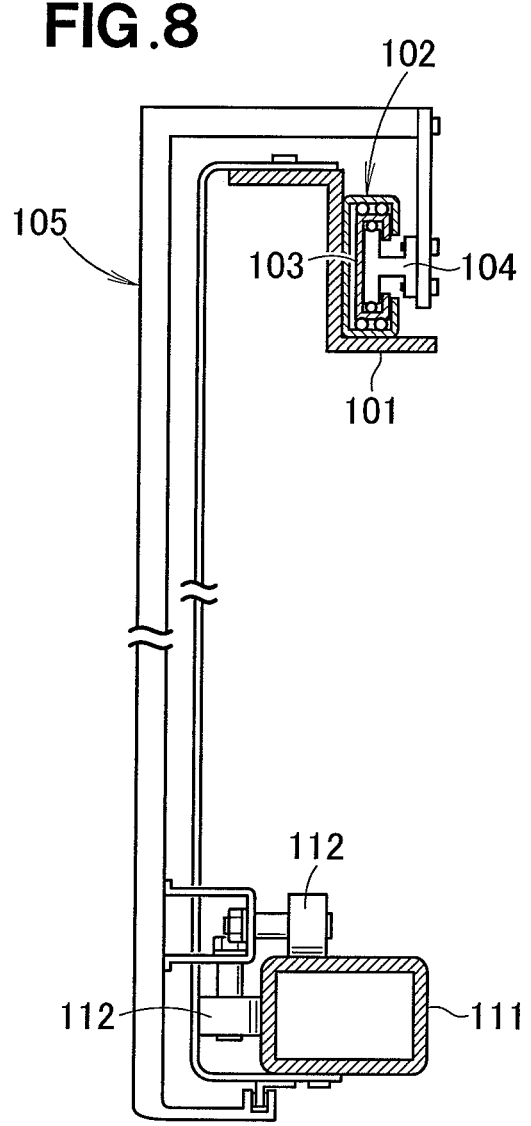
FIG. 8 is a cross-sectional view of another conventional safety cover.

In the full open state shown in FIG. 5A, the lateral frame 101 is absent above the opening 107, unlike the situation shown in FIG. 7. Because there is no lateral frame 101, a degree of freedom of an operator increases, and the work efficiency of the operator improves.

Preferably, as shown in FIG. 5C, a coupling mechanism 55 is provided between the side of the front cover 24 and the safety door 23. The coupling mechanism 55 includes a rod 56 protruding from an upper portion of the safety door 23 and having a sharp point, and a support block 58 disposed on the support frame (front cover 24) and having an engagement hole 57 into which the sharp-point rod 56 fits. It should be noted that the sharp-point rod 56 may be disposed on the support frame (front cover 24) and the support block 58 may be disposed on the safety door 23.

As the safety door 23 starts moving toward the full closed position from the full open state shown in FIG. 5A, the first sliders 43 start moving on the first rail 41. At the same time, the second rail 42 starts moving relative to the second sliders 44.

As a result, the safety door 23 enters the full closed state, as shown in FIG. 5B.

Also, the sharp-point rod 56 fits into the engagement hole 57, as shown in FIG. 5C, which illustrates an enlarged view of the part C in FIG. 5B.

In FIG. 5B, even if an external force F2 acts on the front end of the safety door 23 in a direction perpendicular to the moving direction, the front end of the safety door 23 is not displaced.

Furthermore, as shown in FIG. 4, the second rail 42 is secured on the back face of the safety door 23. It is desired that the length L2 of the second rail 42 be set to approximately two-thirds of the length L1 of the safety door 23.

It is possible to sufficiently reinforce the safety door 23 with the second rail 42. Because the second rail 42 is an indispensable element, the reinforcement of the safety door 23 would not increase the cost. Also, when the second rail 42 has such length, it is possible for the first rail 41 to have the same length as the second rail 42. Thus, the purchase cost of the first rail 41 and the second rail 42 can be reduced.

A modification to the above-described embodiment will now be described with reference to FIG. 6A and FIG. 6B.

Figure 6A:
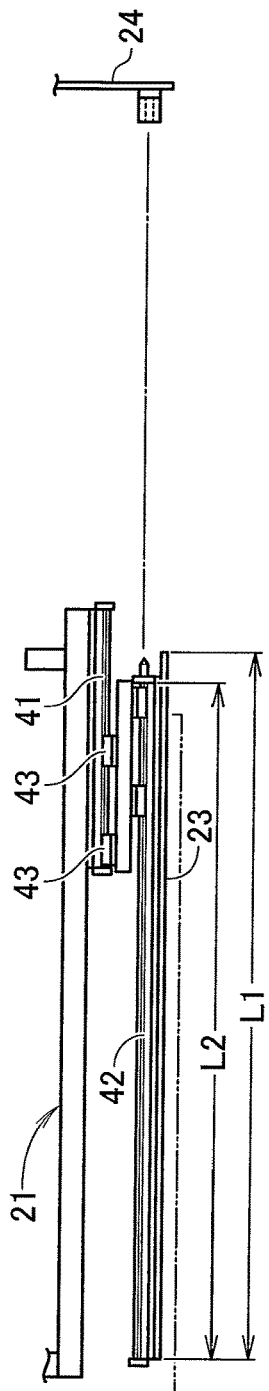
FIG. 6A is a view useful to describe the safety door in the full open state according to a modified embodiment.

As shown in FIG. 6A, the length L2 of the second rail 42 may be substantially equal to the length L1 of the safety door 23. It should be noted that if the second rail 42 has a larger length than this, part of the second rail 42 protrudes from the safety door 23 and this would deteriorate the appearance. Also, part of the second rail 42 would become an obstacle when the mold is changed. Therefore, the length L2 should be equal to or smaller than the length L1 (L2≤L1). When the length L2 is equal to or smaller than the length L1, it is possible to keep the good appearance, and part of the second rail 42 would not become an obstacle when the mold is changed.

Figure 6B:
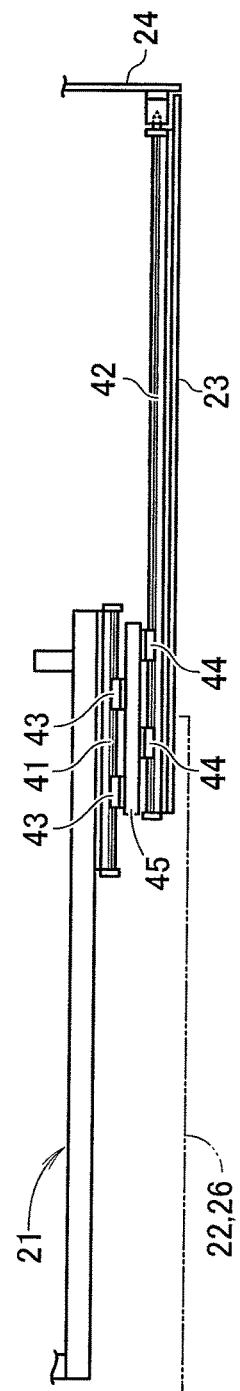
FIG. 6B is a view useful to describe the safety door in the full closed state according to the modified embodiment.

As shown in FIG. 6B, it is possible to move the safety door 23 to the full closed position. The first rail 41 can significantly be short, as compared to the second rail 42.

Another modification will be described with reference to FIG. 6C and FIG. 6D.

Figure 6C:
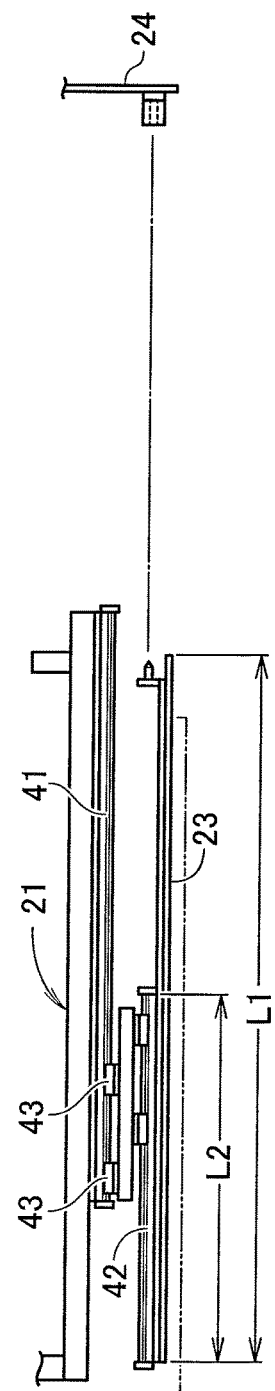
FIG. 6C is a view useful to describe the safety door in the full open state according to a second modified embodiment.

As shown in FIG. 6C, the length L2 of the second rail 42 may be an approximately half of the length L1 of the safety door 23. If the second rail 42 is too short, the reinforcement to the safety door 23 would drop. Therefore, the length L2 should be equal to or greater than 0.5×L1 (0.5×L1≤L2).

Figure 6D:
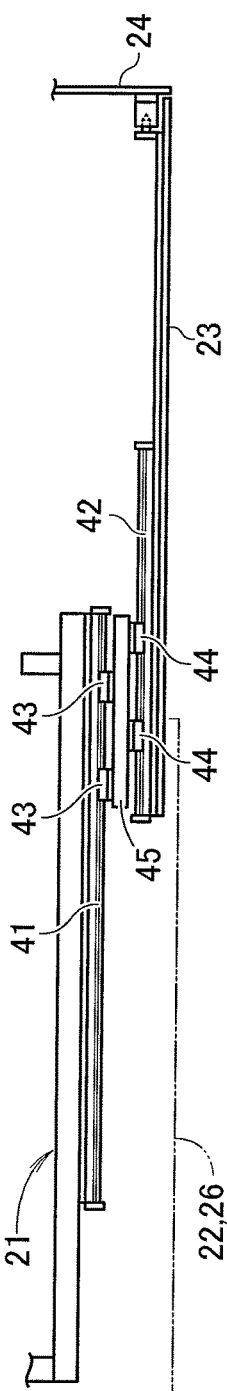
FIG. 6D is a view useful to describe the safety door in the full closed state according to the second modified embodiment.

As shown in FIG. 6D, it is possible to move the safety door 23 to the full closed position. The first rail 41 can significantly be long, as compared to the second rail 42.

As described above, if the length of the second rail 42 is smaller than the half of the length of the safety door 23, the reinforcement to the safety door 23 with the second rail 42 cannot be expected. If the length of the second rail 42 is greater than the length of the safety door 23, part of the second rail 42 protrudes from the safety door 23. This would deteriorate the appearance, and part of the second rail 42 would become an obstacle when the mold is changed.

In order to keep the good appearance while ensuring the reinforcement, and in order to avoid that part of the second rail 42 would become an obstacle when the mold is changed, the length of the second rail 42 is set in a range from 0.5×the safety door length to 1.0×the safety door length (range from 0.5 times to 1.0 time of the length of the safety door 23).

It should be noted that although the first sliders 43 and the second sliders 44 have the steel balls 49 in themselves in the above-described embodiment, the steel balls 49 may be dispensed with such that the first sliders 43 may directly contact the first rail 41 and the second sliders 44 may directly contact the second rail 42.

What is claimed is:

1. A safety cover for a mold clamping device that surrounds the mold clamping device of an injection molding machine, the safety cover comprising:
   a support frame attached to the mold clamping device;
   a stationary cover secured to the support frame;
   a lower rail disposed on the support frame; and
   a safety door having a wheel at a lower portion thereof such that the safety door horizontally moves as the wheel rotates on the lower rail,
   an upper portion of the safety door being connected to the support frame via a connecting mechanism,
   the connecting mechanism including a first rail that is mounted on the support frame and extends in a moving direction of the safety door, a second rail mounted on an upper portion of a back face of the safety door and extends in the moving direction of the safety door, a pair of first sliders movably engaged over the first rail, a pair of second sliders movably engaged over the second rail, and an intermediate plate arranged between the first rail and the second rail, and the intermediate plate having one face that supports the pair of first sliders and another face that supports the pair of second sliders.

2. The safety cover for a mold clamping device according to claim 1, wherein a length of the second rail is set in a range from 0.5×a length of the safety door to 1.0×the length of the safety door.

3. The safety cover for a mold clamping device according to claim 2, wherein the length of the second rail is set to two-thirds of the length of the safety door.

4. The safety cover for a mold clamping device according to claim 1, wherein the pair of first sliders and the pair of second sliders are arranged in a staggered layout when viewed from above.

5. The safety cover for a mold clamping device according to claim 1, wherein the safety door has a coupling mechanism that is mechanically coupled to the support frame when the safety door is fully closed, and the coupling mechanism includes a rod that protrudes from an upper portion of the safety door and has a sharp point, and also includes a support block that is provided on the support frame and has an engagement hole such that the rod fits in the engagement hole.

6. The safety cover for a mold clamping device according to claim 1, wherein the safety door has a coupling mechanism that is mechanically coupled to the support frame when the safety door is fully closed, and the coupling mechanism includes a rod that protrudes from the support frame and has a sharp point, and also includes a support block that is provided on an upper portion of the safety door and has an engagement hole such that the rod fits in the engagement hole.

7. The safety cover for a mold clamping device according to claim 1, wherein first stoppers are provided at right and left ends of the first rail to prevent the first sliders from falling off, respectively, and second stoppers are provided at right and left ends of the second rail to prevent the second sliders from falling off, respectively.

8. The safety cover for a mold clamping device according to claim 1, wherein each of the first sliders is a linear motion guide that has steel balls between the first slider and the first rail, and each of the second sliders is a linear motion guide that has steel balls between the second slider and the second rail.

* * * * *